United States Patent [19]
Uraneck et al.

[11] 3,755,269
[45] Aug. 28, 1973

[54] PRODUCTION OF MERCAPTAN-TERMINATED POLYMERS

[75] Inventors: Carl A. Uraneck; Richard L. Smith, both of Bartlesville, Okla.

[73] Assignee: Phillips Petroleum Company, Bartlesville, Okla.

[22] Filed: Sept. 30, 1971

[21] Appl. No.: 185,343

[52] U.S. Cl. .......................... 260/79.5 NV
[51] Int. Cl. ............................ C08f 27/06
[58] Field of Search .............. 260/79.5 C, 79.5 NV, 260/94.7 S

[56] References Cited
UNITED STATES PATENTS

| 3,193,590 | 7/1965 | Hsieh | 260/665 |
| 3,410,836 | 11/1968 | Hsieh | 260/83.7 |

Primary Examiner—Joseph L. Schofer
Assistant Examiner—C. A. Henderson, Jr.
Attorney—Young & Quigg

[57] ABSTRACT

Polymers having mercaptan terminal groups are prepared by reacting a polymer-metal reactant with an aromatic thioketone to produce a polymer having improved vulcanizate properties.

10 Claims, No Drawings

PRODUCTION OF MERCAPTAN-TERMINATED POLYMERS

This invention relates to the production of mercaptan terminated polymers.

In one of its more specific aspects, this invention relates to the production of rubbery polymers having mercaptan terminal groups, the polymers having superior vulcanizate properties when compounded in typical sulfur-based vulcanization systems. Such polymers, because of their superior vulcanizate properties, are peculiarly suitable for incorporation in rubber formulations. Previous attempts to prepare such polymers from polymers having terminal polymermetal groups by employing sulfur, cyclic disulfides and other sulfur-containing substances, however, have been largely unsuccessful in that the mercaptan content of the polymer product has been less than theoretical because of side reactions or coupling reactions occurring during polymer isolation. There has now been discovered a method of employing a reagent which largely avoids these problems and gives a product having close to the theoretical mercaptan content. This invention presents that method and the product produced therefrom.

According to this invention there is provided a method for producing a polymer which involves reacting a polymer-metal reactant with an aromatic thioketone to produce a polymer having improved vulcanized properties. The invention also concerns the polymers, themselves.

The method of this invention is applicable to polymers having the general formula $P(M)_x$, wherein P is a polymer as hereinafter defined, M is an alkali metal or an alkaline earth metal such as a metal selected from Group 1a or Group 2a of the Periodic Table as shown in the *Handbook of Chemistry and Physics*, Chemical Rubber Company, 46th Edition (1965), page B-3 and $x$ is an integer having a value of from 1 to 4.

The polymers referred to above include those prepared from monomers such as conjugated dienes having from 4 to 12 carbon atoms per molecule, from vinyl aromatic hydrocarbons having from 8 to 20 carbon atoms per molecule and from esters of acrylic and methacrylic acid, alpha-beta-unsaturated nitriles, vinyl pyridines and like substances having from 3 to 20 carbon atoms per molecule. Preferred polymers are formed using 1,3-butadiene, isoprene, 1,3-pentadiene, styrene, 4-methylstyrene, 4-tertiary-butylstyrene, methyl methacrylate, arcylonitrile, methacrylonitrile, 2-vinylpyridine and the like.

Such polymers are formed by methods well known in the art, these methods employing monofunctional or multifunction orgaonmetal initiators or the metals themselves wherein the metal is selected from Groups 1a and 2a of the Periodic Table. Copolymers of two or more of the mentioned monomers can be formed.

Particularly suitable polymers are polybutadiene and butadiene-styrene copolymers, either having one or two lithium atoms per molecule, these being prepared by polymerization initiated with organolithium compounds such as n-butyllithium or 1,6-dilithiohexane.

This invention contemplates the use of aromatic thioketones having the general formula

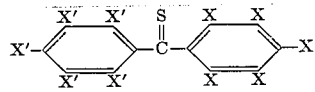

wherein X' and X can be alike or different, both being selected from the group consisting of hydrogen, alkyl, cycloalkyl, alkoxy and dialkylamino substituents. Generally, the total number of carbon atoms of the X' groups or the X groups on either ring will not exceed 12.

Suitable aromatic thioketones include thiobenzophenone; 4,4'-dimethyl-thiobenzophenone; 3,3'-dicyclohexylthiobenzophenone; 4,4'dimethoxythiobenzo-phenone; 4,4'-bis(dimethylamino)thiobenzophenone; 4-methyl-4'-methoxythio-benzophenone; 4,4'-diethoxythiobenzophenone; 2,2'-dimethoxythiobenzophenone; 3,4-dimethoxythiobenzophenone; 4-dimethylaminothiobenzophenone; and 2,2', 3,3'-tetramethylthiobenzophenone.

The aromatic thioketone or a mixture of such thioketones is employed in an amount within the range of from about 0.5 to about 4 moles per equivalent of metal in the polymer-metal reactant, $P(M)_x$. The thioketone and polymer metal reactant are reacted at a temperature within the range of about 0° to about 150° C. for a period of from 0.5 minutes up to about 10 hours, preferably at a pressure which maintains the reactants substantially in the liquid phase.

Inasmuch as the polymer-metal reactant is usually prepared in the presence of an inert hydrocarbon diluent, it is convenient to conduct the reaction with the aromatic thioketone in the presence of this diluent, introducing the aromatic thioketone into the polymerization reaction mixture prior to shortstopping the polymerization reaction.

The reaction product of the polymer-metal reactant and the aromatic thioketone is recovered by conventional recovery procedures such as coagulation or steam-stripping. Generally, it is not necessary to perform a separate hydrolysis step during the polymer recovery procedure for the purpose of converting the S-M group to the S-H group because this conversion takes place normally during steam-stripping or coagulation with alcohol. An antioxidant can be added in the usual manner to the reaction mixture prior to the polymer recovery.

It is desirable to avoid excessive loss of the S-H functional group during recovery as a result of contact with oxygen or air. Similarly, it is desirable to avoid excessively high temperatures, such as temperatures above 300° F. in the recovery and drying of the polymer.

The following examples illustrate the method of this invention as applied in the preparation of polybutadiene polymers and butadiene/styrene polymers.

EXAMPLE I

Polybutadiene-lithium products were produced by polymerizing 100 parts by weight of 1,3-butadiene in the presence of 1,400 parts by weight of cyclohexane by 7 gram millimoles per 100 g of butadiene of n-butyllithium at about 70° C. for about 20 minutes.

Each polymerization reaction mixture prepared with the above recipe using a 10 g monomer charge was reacted with either 4,4-bis-(dimethylamino)thiobenzophenone (DMATB) or 1,8-naphthalenedisulfide (NDS) for about 10 minutes at about 50° C. Certain of the resulting mixtures were then treated with 2 ml of isopropyl alcohol (IPA) or 2 ml of acetic acid (HAC) to hydrolyze the P-S-Li species to P-S-H. Each mixture was then analyzed for -S-H or -S-Li content. Then a stream of air was passed through each mixture for 10 minutes at about 25° C. with analyses for S-H and S-Li being conducted thereafter. Results were as follows:

| Run | DMATB, mhm. | NDS, mhm. | HAC, ml. | IPA, ml. | -S-H or -S-Li M Con. ×10³ Initial | Air exposed |
|---|---|---|---|---|---|---|
| 1 | 7 | 0 | 0 | 2 | 4.15 | 4.50 |
| 2 | 7 | 0 | 0 | 0 | 4.90 | 1.87 |
| 3 | 7 | 0 | 2 | 0 | 4.4 | 4.50 |
| 4 | 0 | 7 | 2 | 0 | 4.6 | 0 |
| 5 | 0 | 7 | 0 | 0 | 4.4 | 0 |
| 6 | 0 | 7 | 0 | 2 | 4.5 | 0 |

The above results indicate the superiority of the method of this invention, that is, the use of aromatic thioketones such as 4,4-bis(dimethyl-amino)thiobenzophenone as compared to the use of sulfur-containing organic compounds such as 1,8-naphthalenedisulfide. While both substances gave about the same yield of the -S-Li or -S-H constitutents as a result of the initial reaction, subsequent exposure of air caused a much greater loss of these constituents when the 1,8-naphthalenedisulfide was used than when the aromatic thioketone was used.

EXAMPLE II

Polymer A was prepared by polymerizing 1,3-butadiene and styrene in cyclohexane employing a conventional prior art method. At the end of a defined polymerization period, 4,4'-bis(dimethylamino)thiobenzophenone in an amount within the range previously prescribed was added to the reaction mixture and allowed to react at 50° C. for 10 minutes. An antioxidant was added and the polymer was recovered. Upon analysis, the concentration of the -S-H group was determined as $5.1 \times 10^{-3}$ mmoles per gram of polymer as compared to a theoretical maximum of $8.5 \times 10^{-3}$ mmoles per gram of polymer.

Polymer B was prepared according to a procedure substantially identical to that used to prepare Polymer A except that no aromatic thioketone was employed in its production.

Both polymers were then individually incorporated in a rubber compounding recipe conventionally employed in such comparative analyses, both compounded stocks being compounded, cured and tested in substantially the identical manner. The results of those comparative tests are set forth below, the testing methods in each instance being according to conventional ASTM procedures.

| | Polymer A | B |
|---|---|---|
| Raw Mooney Viscosity, ML-4 | 39.5 | 37 |
| Compounded Mooney, ML-4 | 63.5 | 70 |
| 300% Modulus, psi | 1735 | 1645 |
| Tensile, psi | 3950 | 3960 |
| Elongation, % | 505 | 520 |
| Heat Build-up, ΔT °F. | 59 | 66.5 |
| Resilience, % | 71.4 | 67.1 |
| Shore A Hardness | 61.5 | 64.5 |

The above data indicate that Polymer A, the polymer produced by the method of this invention, had significantly improved dynamic properties such as heat build-up and resilience compared to Polymer B which was produced in the absence of the practice of this invention, while having comparable stress-strain properties. These data also indicate that the method of this invention is applicable to both homopolymers and copolymers.

It It will be evident that various modifications may be made to the method of this invention. However, such are considered to be within the scope of the invention.

We claim:

1. A composition prepared by the process of reacting (a) a metal-terminated polymer having the general formula $P(M)_x$ wherein P is a polymer prepared from a material selected from the group consisting of conjugated dienes having 4 to 12 carbon atoms per molecule, vinyl aromatic hydrocarbons having 8 to 20 carbon atoms per molecule, esters of acrylic acid and methacrylic acid, alpha,beta-unsaturated nitriles, and vinyl pyridines having 3 to 20 carbon atoms per molecule, M is an alkali metal or an alkaline earth metal and x is an integer having a value within the range of from 1 to 4, and (b) an aromatic thioketone having the formula

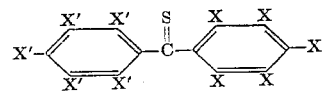

wherein X' and X are selected from the group consisting of hydrogen, alkyl, cycloalkyl, alkoxy and dialkylamino radicals, the total number of carbon atoms of said X' and X on either of the benzene rings being not greater than 12.

2. The composition of claim 1 in which said metal-terminated polymer is a lithium-contained polybutadiene polymer.

3. The composition of claim 1 in which said metal-terminated polymer is a lithium-containing butadiene-styrene polymer.

4. The composition of claim 1 in which said metal-terminated polymer is formed from at least one material selected from the group consisting of 1,3-butadiene, isoprene, 1,3-pentadiene, styrene, 4-methylstyrene, 4-tertiary-butylstyrene methyl methacrylate, acrylonitrile, methacrylonitrile and 2-vinylpyridine.

5. The composition of claim 1 in which said aromatic thioketone is selected from the group consisting of thiobenzophenone; 4,4'-dimethylthio-benzophenone; 3,3'-dicyclohexylthiobenzophenone; 4,4'-dimethoxythiobenzo-phenone; 4,4'-bis(dimethylamino)thiobenzophenone; 4-methyl-4'-methoxythio-benzophenone; 4,4'-diethoxythiobenzophenone; 2,2'-dimethoxythiobenzophenone; 3,4-dimethoxythiobenzophenone; 4-dimethylaminothiobenzophenone; and 2,2',3,3'-tetramethylthiobenzophenone.

6. The composition of claim 1 in which said aromatic ketone is 4,4-bis(dimethylamino)thiobenzophenone.

7. The composition of claim 2 in which said aromatic ketone is 4,4-bis(dimethylamino)thiobenzophenone.

8. The composition of claim 3 in which said aromatic ketone is 4,4-bis(dimethylamino)thiobenzophenone.

9. The composition of claim 1 in which said aromatic thioketone is reacted with said metal terminated polymer in an amount within the range of from about 0.5 to about 4 moles per equivalent of metal in said metal-terminated polymer.

10. The composition of claim 8 in which said 4,4-bis(dimethylamino)-thiobenzophenone is reacted with said lithium-containing butadiene-styrene polymer in an amount within the range of from about 0.5 to about 4 moles per equivalent of lithium in said polymer.

* * * * *